Patented Dec. 9, 1952

2,621,110

UNITED STATES PATENT OFFICE 2,621,110

RECOVERY OF RADIOACTIVE PHOSPHORUS FROM NEUTRON IRRADIATED SULFUR

John G. MacHutchin and La Verne C. Watson, Deep River, Ontario, Canada, assignors to National Research Council, Ottawa, Ontario, Canada, a body corporate of Canada No Drawing. Application March 15, 1951, Serial No. 215,854

5 Claims. (Cl. 23—165)

This invention relates to the recovery of radioactive phosphorus of atomic weight 32 from neutron irradiated sulphur.

An object of the invention is to provide a convenient method, capable of remote control, whereby maximum recovery of $P_{32}$ may be obtained from neutron irradiated sulphur.

A further object of the invention is to obtain phosphorus 32 substantially carrier free.

In carrying out the invention the neutron irradiated sulphur, which has preferably been purified by recrystallization prior to irradiation, is treated with a substantially water immiscible solvent for sulphur and which is chemically unreactive with the sulphur and an aqueous acid which is substantially chemically unreactive with the sulphur or solvent.

Effective solvents must have a specific gravity greater than that of water and greater than that of the acid used at concentrations of 0.005 N or greater in order that the required separations may be made. They must dissolve the sulphur, without requiring quantities which are difficult to handle by remote control and the solutions formed must not be too viscous for effective working. The solvents may have a greater solubility for sulphur with increasing temperature, although this is not essential. The following solvents have been found to be effective—tetrachloroethane, di- and trichloroethylene, carbon disulphide and tetrabromoethane. One of tetrachloroethane and S-tetrachloroethane has been used most successfully and is preferred.

The acid used may be the halogen acids, hydrochloric and hydrofluoric or mixtures of them, or acetic acid. Nitric acids are undesirable. A volatile acid like hydrochloric is preferred. The strength or concentration of the acid used is not critical. The aqueous acid must be sufficiently strong to collect all the activity in the material under treatment in a limited number of washings. In acid solution $P_{32}$ as phosphate does not adsorb appreciably on the glassware used.

The mixture of sulphur, solvent and aqueous acid is heated to a temperature at which refluxing of one or more components of the mixture occurs to melt and dissolve the sulphur in the solvent to cause stirring to ensure dissolution of the phosphorus 32 component contained in the sulphur into the aqueous acid. Upon cooling the mixture the aqueous phase containing $P_{32}$ in oxidized form segregates above the sulphur-solvent components. The aqueous acid phase is removed and evaporated to dryness. The $P_{32}$ is recovered by adding dilute hydrochloric to the dry mass.

The $P_{32}$ recovered is in the form of an oxide. It is not known whether this oxide forms during irradiation of the sulphur or subsequently during dissolution.

The following example illustrates the operation of the method in detail.

The usual aluminum foil wrappings were removed from pile-irradiated sulphur slugs by remote control methods of known character and the slugs were placed in a reaction flask. S-tetrachloroethane and I–N hydrochloric acid were introduced into the vessel with the sulphur slugs. The proportions of solvent and acid conveniently used are about 350 ml. of solvent and about 150 ml. of I–N hydrochloric acid to 60–70 grams of sulphur. The mixture was heated to refluxing temperature, normally about 115°–120° C. at which the sulphur is dissolved. The mixture was then agitated to hasten and complete dissolution of the sulphur and to provide maximum contact of the sulphur solution with the aqueous phase. The mixture was then allowed to cool conveniently to say 25° C., a point at which the phases separate effectively.

The aqueous phase known hereinafter as the first aqueous phase was then separated or withdrawn, preferably by vacuum to a second vessel. To insure removal of the phosphorus from the reaction flask, the flask was washed twice with water, or dilute HCl, say 0.005 N, and the wash solutions were transferred to the second vessel, containing the aqueous phase, which was heated, refluxed and evaporated to dryness under slightly reduced pressure to avoid loss of the active phosphorus and to insure recovery of any active phosphorus adhering to the walls of the vessel.

The dry material was dissolved in 0.005 N HCl, heated and refluxed to wash down the walls of the vessel. The resulting solution was cooled (e. g. to room temperature) and caused to flow, preferably by gravity through a bed of freshly-regenerated washed cation exchange resin, i. e., "Dowex 50," in the hydrogen form, by which any metallic cations are essentially removed from the solution. The resin used was 40–100 mesh and the flow rate of the solution through the column was one milliliter per sq. cm. of resin bed per minute. The second vessel was washed out twice with refluxing with 0.005 N HCl and the washings were passed through the resin column.

The effluent from the resin column was substantially free from metallic cations and was evaporated to dryness under reduced pressure.

A 1:1 water-hydrogen peroxide mixture was added to the solution prior to evaporation to oxidize any traces of dissolved resin. The dry material was taken up in 0.005 N HCl as a final product solution for dispensing or other purposes. Recovery of $P_{32}$ is increased by subjecting the treated material to another treatment as just described.

The following are illustrative of the recoveries of $P_{32}$ from the irradiated sulphur:

(1) Weight irradiated sulphur=64 gm.
  Volume tetrachloroethane added=350 ml.
  Volume 1 N HCl added=150 ml.
  Volume final product solution =19.9 ml.
  Concentration $P_{32}$=10.35 mc./ml. in final product solution.

Of the total phophorus in the irradiated sulphur, 60–65% is recovered in the first aqueous phase, separating above the sulphur-solvent mixture. Of this recovered phosphorus 32, 70 to 75% is recovered in the final product.

Analysis of final product solution:
  Total solids_____ 530 µg./ml.
  Non-volatile_____ 45 µg./ml.
  pH_____ 1.6.
  Al_____ Not detected.
  Fe_____ Not detected.

(2) Weight irradiated sulphur=80 gm.
  Volume tetrachloroethane added=350 ml.
  Volume 1 N HCl added=150 ml.
  Volume final product solution=21.0 ml.
  Concentration $P_{32}$=10.25 mc./ml.

Of the total phosphorus in the irradiated sulphur, 60–65% is recovered in the first aqueous phase separating above the sulphur-solvent mixture and of this recovered phosphorus 32, 70–75% is recovered in the final product.

Analysis of product solution:
  Total solids_____ 480 µg./ml.
  Non-volatile_____ 125 µg./ml.
  pH_____ 0.4.
  Al_____ Not detected.
  Fe_____ Not detected.

(3) 15.5 grams of irradiated sulphur were treated with 150 milliliters of tetrachloroethane and 120 milliliters of 1 N hydrochloric acid by heating to refluxing for one hour. 89% of the $P_{32}$ in the sulphur was recovered in the aqueous HCl.

The material may be retreated two or more times to obtain substantially complete extraction of the $P_{32}$.

By heating the mixture during the reaction as indicated less solvent is required to dissolve the sulphur and the reaction is easily operated by remote control. However the amount of solvent must be such as to avoid forming a saturated solution of sulphur at elevated temperatures from which extraction of the $P_{32}$ is difficult. Cooling the mixture aids the separation of the aqueous phase and at 25° C. or less the aqueous phase separates cleanly from the solvent phase. When the finally dried product is dissolved in 0.005 N HCl it is in a preferred form for use by research workers in industry and medicine.

We claim:

1. A method of recovering radioactive phosphorus from neutron irradiated sulphur which comprises adding to the sulphur a solvent for sulphur and an aqueous acid, said solvent and said acid being substantially unreactive with the sulphur and with each other, said solvent having a specific gravity greater than that of 0.005 N aqueous acid, heating the mixture to a temperature to reflux the acid component and agitating the mixture to insure dissolution of the sulphur, cooling the mixture to segregate the aqueous phase and removing the aqueous phase containing phosphorus 32 in an oxidized form from the solvent and sulphur.

2. A method of recovering radioactive phosphorus from neutron irradiated sulphur which comprises adding to the sulphur a solvent for sulphur and an aqueous acid, said solvent and said acid being substantially unreactive chemically with the sulphur and with each other, said aqueous acid having a specific gravity less than that of the solvent and less than that of the sulphur, heating the mixture to a temperature to reflux the acid component of the mixture and agitating the mixture to insure dissolution of the sulphur, cooling the mixture to segregate the aqueous phase and removing the aqueous phase containing phosphorus 32 in an oxidized form from the solvent and sulphur.

3. A method of recovering radioactive phosphorus from neutron irradiated sulphur which comprises adding to the irradiated sulphur a solvent, being one of a group consisting of tetrachloroethane, di- and trichloroethylene, carbon disulphide and tetrabromoethane, and a mineral acid which is substantially unreactive with the sulphur or solvent, heating the mixture while refluxing at least one component of the mixture, agitating the mixture to insure dissolution of the sulphur, cooling the mixture to segregate the aqueous phase and removing the aqueous acid phase containing $P_{32}$ in an oxidized form.

4. A method of recovering radioactive phosphorus from neutron irradiated sulphur which comprises adding to the sulphur a solvent from a group consisting of tetrachloroethane, di- and trichloroethylene, carbon disulphide and tetrabromoethane, and acid from the group consisting of hydrochloric, hydrofluoric, and acetic, heating the mixture to a temperature of about 115 to 120° C. while refluxing the acid, agitating the mixture to insure dissolution of the sulphur, cooling to at least about 25° C. to segregate the aqueous phase and removing the latter containing $P_{32}$ in an oxidized form from the solvent phase.

5. A method as defined in claim 4 wherein the aqueous phase is evaporated to dryness under reduced pressure, and the dry material is dissolved in dilute hydrochloric acid to form a solution which is treated with a cation exchange resin to remove metallic ions, treating the solution to remove traces of resin, evaporating the solution to dryness and dissolving the residue in dilute hydrochloric acid.

JOHN G. MacHUTCHIN.
LA VERNE C. WATSON.

No references cited.